US012585729B2

(12) United States Patent
Vadrevu et al.

(10) Patent No.: US 12,585,729 B2
(45) Date of Patent: *Mar. 24, 2026

(54) VISUAL REPRESENTATION GENERATION FOR BIAS CORRECTION

(71) Applicant: Capital One Services, LLC, McLean, VA (US)

(72) Inventors: Vyjayanthi Vadrevu, Pflugerville, TX (US); Lin Ni Lisa Cheng, Great Neck, NY (US); Xiaoguang Zhu, New York, NY (US)

(73) Assignee: Capital One Services, LLC, McLean, VA (US)

( * ) Notice: Subject to any disclaimer, the term of this patent is extended or adjusted under 35 U.S.C. 154(b) by 42 days.

This patent is subject to a terminal disclaimer.

(21) Appl. No.: 18/418,894

(22) Filed: Jan. 22, 2024

(65) Prior Publication Data

US 2024/0242231 A1 Jul. 18, 2024

Related U.S. Application Data

(63) Continuation of application No. 17/304,998, filed on Jun. 29, 2021, now Pat. No. 11,880,847.

(51) Int. Cl.
*G06Q 10/00* (2023.01)
*G06F 16/535* (2019.01)
(Continued)

(52) U.S. Cl.
CPC .......... *G06F 18/214* (2023.01); *G06F 16/535* (2019.01); *G06Q 30/016* (2013.01)

(58) Field of Classification Search
CPC ... G06Q 30/016; G06F 16/535; G06F 16/538; G06F 18/214; G06N 20/00; G06V 40/174
(Continued)

(56) References Cited

U.S. PATENT DOCUMENTS 9,009,082 B1 * 4/2015 Marshall ............ G06Q 30/0601
705/26.1
11,048,744 B1 * 6/2021 Hohwald ................ G06F 16/51
(Continued)

FOREIGN PATENT DOCUMENTS

CA 2937983 C * 12/2019 ......... G06Q 30/0631
NZ 501585 A * 4/2002

OTHER PUBLICATIONS

Salminen et al. "Analyzing Demographic Bias in Artificially Generated Facial Pictures" CHI Apr. 25-30, 2020, Honolulu, HI, USA. (Year: 2020).*
(Continued)

*Primary Examiner* — Kelly S. Campen
(74) *Attorney, Agent, or Firm* — Harrity & Harrity, LLP

(57) ABSTRACT

In some implementations, a device may determine an interaction profile for a provider that is to engage with a user in a communication session. The interaction profile may be based on interaction data relating to interpersonal interactions involving the provider during one or more previous communication sessions. The interaction profile may indicate a bias of the provider in connection with one or more categories of users. The device may generate, based on the interaction profile, a visual representation that depicts at least a face of a person for presentation to the provider during the communication session. One or more characteristics associated with the one or more categories of users may be absent from the face of the person. The device may cause presentation of the visual representation to the provider during the communication session.

20 Claims, 7 Drawing Sheets

(51) Int. Cl.
*G06F 18/214* (2023.01)
*G06Q 30/016* (2023.01)

(58) Field of Classification Search
USPC ................................................. 705/304, 26.1
See application file for complete search history.

(56) References Cited

U.S. PATENT DOCUMENTS

| | | | |
|---|---|---|---|
| 11,604,927 B2 * | 3/2023 | Beaver | ................... G06F 40/30 |
| 2016/0224803 A1 * | 8/2016 | Frank | ................... G06F 21/6245 |
| 2019/0354935 A1 * | 11/2019 | Hanratty | ............ G06Q 10/1053 |
| 2022/0070295 A1 * | 3/2022 | Shah | ...................... G06N 20/00 |
| 2022/0101146 A1 * | 3/2022 | el Kaliouby | ......... G06N 3/0455 |
| 2022/0414677 A1 | 12/2022 | Vadrevu et al. | |
| 2024/0232406 A9 * | 7/2024 | Edwards | ............. G06F 21/6218 |

OTHER PUBLICATIONS

English translation NZ501585 (Year: 1998).*
English translation of ca2937983 (Year: 2019).*
Salminen et al. "Analyzing Demographic Bias in Artificially Generated Facial Pictures" Apr. 25-30, 2020, CHI Honolulu, HI, USA. (Year: 2020).*
Linzmajer, Marc, et al. "Customer ethnic bias in service encounters." 2020, Journal of Service Research 23.2: 194-210. (Year: 2020).*
Salminen J., "Analyzing Demographic Bias in Artificially Generated Facial Pictures," Extended Abstracts of the 2020 CHI Conference on Human Factors in Computing Systems, Apr. 2020, pp. 1-8.

* cited by examiner

100

110
Obtain information
associated with the user

Provider

Device

105
Request for communication session

User

Device

100

115

Determine an interaction profile for the provider

Provider

Device

Interaction Profile
User Category 1 – Bias
User Category 2 – Bias
User Category 3 – No Bias
. . .

Device

User

500

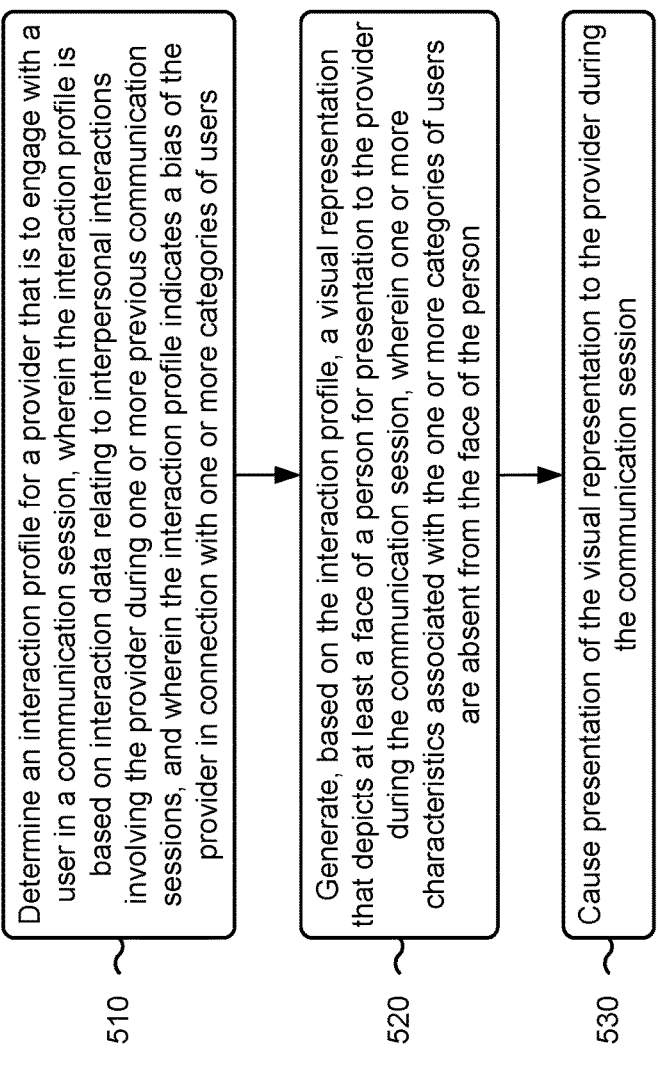

510  Determine an interaction profile for a provider that is to engage with a user in a communication session, wherein the interaction profile is based on interaction data relating to interpersonal interactions involving the provider during one or more previous communication sessions, and wherein the interaction profile indicates a bias of the provider in connection with one or more categories of users 520  Generate, based on the interaction profile, a visual representation that depicts at least a face of a person for presentation to the provider during the communication session, wherein one or more characteristics associated with the one or more categories of users are absent from the face of the person 530  Cause presentation of the visual representation to the provider during the communication session

FIG. 5

VISUAL REPRESENTATION GENERATION FOR BIAS CORRECTION

RELATED APPLICATION

This application is a continuation of U.S. patent application Ser. No. 17/304,998, filed Jun. 29, 2021 (now U.S. Pat. No. 11,880,847), which is incorporated herein by reference in its entirety.

BACKGROUND

A customer service center (e.g., a call center, chat interface, or the like) is equipped to handle customer communications such as telephone communications, e-mail, messages, and/or live chat communications. The customer service center may route such communications to appropriate employees (e.g., service representatives) and/or platforms associated with an entity in order to receive and/or respond to customer feedback regarding services provided by the entity, transactions involving the entity, or the like.

SUMMARY

In some implementations, a system for image generation includes one or more memories, and one or more processors, communicatively coupled to the one or more memories, configured to: receive a request to connect a user and a provider in a communication session; determine, based on receiving the request, an interaction profile for the provider, wherein the interaction profile is based on interaction data relating to interpersonal interactions involving the provider during one or more previous communication sessions, and wherein the interaction profile indicates a bias of the provider in connection with one or more categories of users; generate, based on the interaction profile, an image that depicts at least a face of a person for presentation on a device of the provider during the communication session, wherein one or more characteristics associated with the one or more categories of users are absent from the face of the person; and cause presentation of the image on the device of the provider during the communication session.

In some implementations, a method of image generation includes receiving, by a device of a provider, a request to display information associated with a user for the provider; determining, by the device, based on receiving the request, an interaction profile for the provider, wherein the interaction profile indicates a bias of the provider in connection with one or more categories of users; generating, by the device, based on the interaction profile, an image that depicts at least a face of a person for presentation with the information on the device, wherein one or more characteristics associated with the one or more categories of users are absent from the face of the person; and causing, by the device, presentation of the image with the information.

In some implementations, a non-transitory computer-readable medium storing a set of instructions for visual representation generation includes one or more instructions that, when executed by one or more processors of a device, cause the device to: determine an interaction profile for a provider that is to engage with a user in a communication session, wherein the interaction profile is based on interaction data relating to interpersonal interactions involving the provider during one or more previous communication sessions, and wherein the interaction profile indicates a bias of the provider in connection with one or more categories of users; generate, based on the interaction profile, a visual representation that depicts at least a face of a person for presentation to the provider during the communication session, wherein one or more characteristics associated with the one or more categories of users are absent from the face of the person; and cause presentation of the visual representation to the provider during the communication session.

BRIEF DESCRIPTION OF THE DRAWINGS

FIG. 5 is a flowchart of an example process relating to visual representation generation for bias correction.

DETAILED DESCRIPTION

Figure 1A:
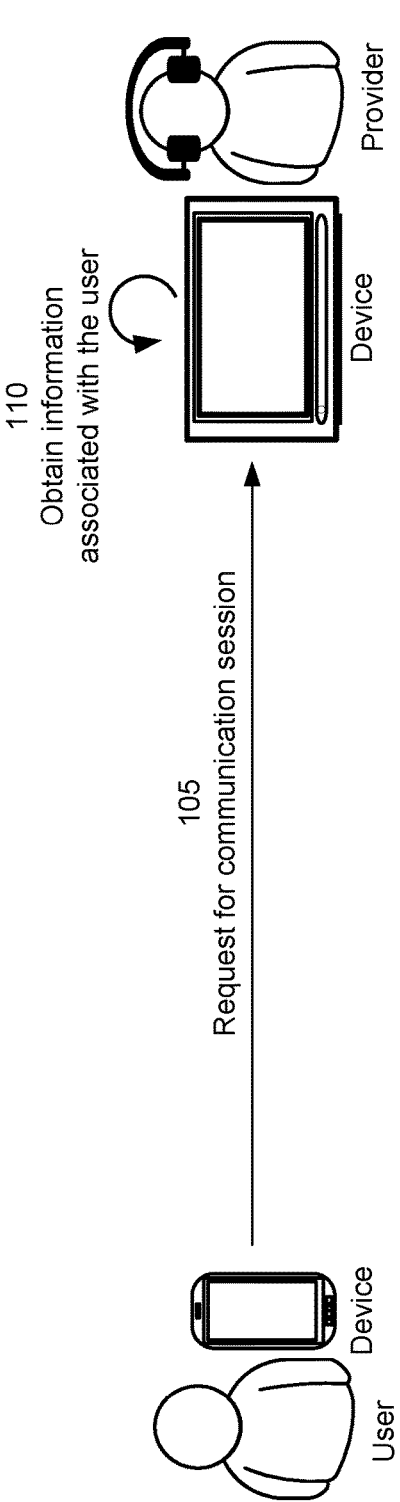
FIGS. 1A-1C are diagrams of an example implementation relating to visual representation generation for bias correction.

The following detailed description of example implementations refers to the accompanying drawings. The same reference numbers in different drawings may identify the same or similar elements.

A provider of services may interact with a user or determine a disposition for an application of the user. For example, the provider (e.g., a customer service representative) may engage in a telephone call with the user to provide information to the user, receive feedback from the user, respond to feedback from the user, or the like. Typically, during the telephone call, a device used by the provider may display demographic information associated with the user, such as an age of the user, a residence location of the user, a gender of the user, a race of the user, an ethnicity of the user, or the like. As another example, the provider (e.g., a loan officer) may use a device to retrieve and display an application (e.g., a loan application) submitted by the user, which may include demographic information associated with the user.

In some cases, the provider may exhibit bias toward the user based on the demographic information associated with the user. In the example of the telephone call, this can result in longer call times, additional call transfers (e.g., to a manager of the provider), or the like, thereby consuming excessive processing resources and/or network resources. In the example of the application, this can result in repetitive application submissions by the user in response to a rejection of the application. However, it is technically difficult to determine or predict which categories of users that the provider may exhibit bias toward, as well as difficult to reduce or prevent the bias using automated methods.

A solution to the above technical problems is described herein for determining the categories of users toward which a provider may exhibit bias, and for generating an image designed to reduce or prevent the bias based on the categories of users. In some implementations, a device may determine an interaction profile for the provider that indicates a bias of the provider in connection with one or more categories of users. For example, the device may use a model trained to identify bias to determine the interaction profile based on interaction data that relates to previous interpersonal interactions involving the provider. In some implementations, the device may generate a visual representation (e.g., an image) that depicts at least a face of a person for presentation on a device of the provider during an interaction with a user (e.g., a telephone call with the user) and/or for presentation on the device of the provider along with information associated with the user (e.g., an application submitted by the user). The device may generate the visual representation using an artificial intelligence technique, such as a generative adversarial network. The device may generate the image such that characteristics associated with the one or more categories of users, for which the interaction profile of the provider indicates bias, are absent from the face of the person.

In this way, the device may apply a rigorous and automated process to determine or predict the bias of a provider and to generate a visual representation for combating the determined bias of the provider. The techniques described herein increase accuracy and consistency and reduce delay associated with bias determination and correction. Moreover, the techniques described herein can reduce call times, reduce call transfers, reduce repetitive application submissions, or the like, thereby conserving associated processing resources and/or network resources.

Figure 1B:
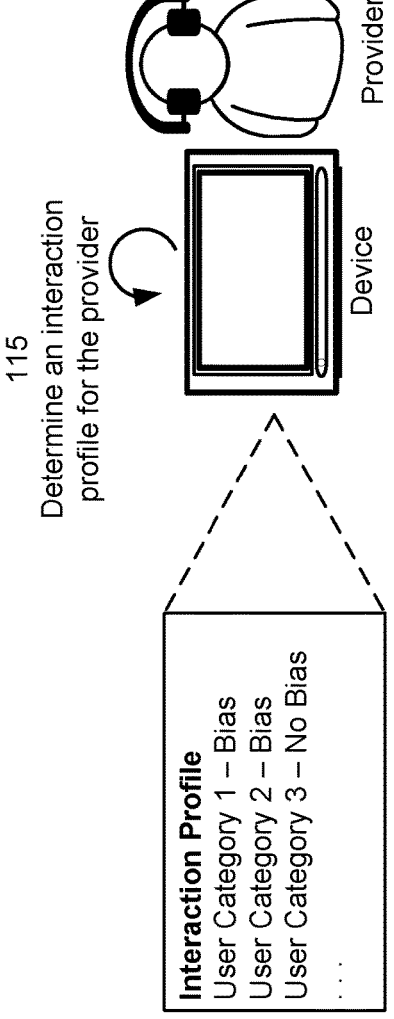
Figure 1B:
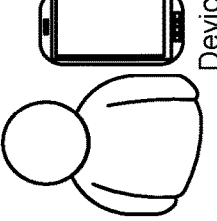
Figure 1C:
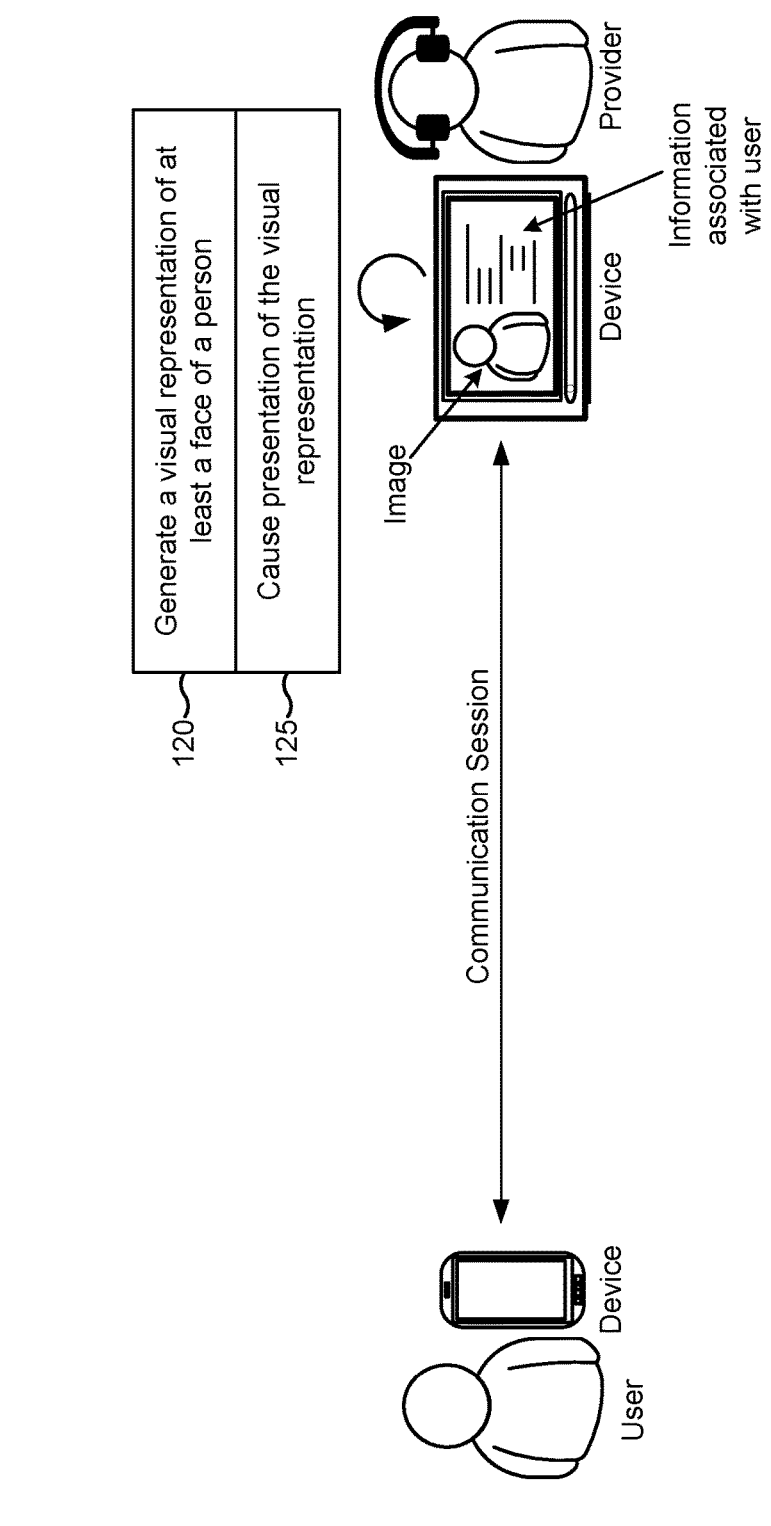

FIGS. 1A-1C are diagrams of an example 100 associated with visual representation generation for bias correction. As shown in FIGS. 1A-1C, example 100 includes a device associated with a user (referred to herein as the "user device") and a device associated with a provider (referred to herein as the "provider device"). These devices are described in more detail in connection with FIGS. 3 and 4. In some examples, the provider may be a provider of services (e.g., informational services, financial services, legal services, medical services, or the like). For example, the provider may be a customer service representative, a doctor, a nurse, a lawyer, an accountant, a loan officer, or the like. The user may be a user of the services of the provider. For example, the user may be a customer or a potential customer, a patient or a potential patient, a client or a potential client, or the like.

As shown in FIG. 1A, and by reference number 105, the provider device may receive a request for a communication session originating from the user device. For example, the provider device may receive a request to connect the user and the provider in a communication session (e.g., a telecommunication session). The communication session may include a voice call (e.g., a telephone call or a Voice over Internet Protocol (VoIP) call), an electronic chat, a video call, and/or a virtual meeting, among other examples.

In some examples, the provider device may receive the request from the user device. For example, the user device may place a call directly to the provider device. In some other examples, the provider device may receive the request from an intermediary system between the user device and the provider device. For example, the user device may place a call to a call center that is operated by the intermediary system, and the intermediary system may route the call to the provider device (e.g., via the request to the provider device). In some implementations, the request for the communication session may be received at a different device associated with the provider. Here, the communication session may be conducted via the different device, and the provider device may be used to retrieve and present information associated with the user, as described below. The provider device (or the different device) may accept the request for the communication session, thereby establishing the communication session between the user and the provider.

As shown by reference number 110, the provider device may obtain information associated with the user. The information associated with the user may include demographic information associated with the user, account information associated with the user, and/or an application submitted by the user (e.g., to receive one or more services from the provider, such as loan services), among other examples. The information associated with the user may identify one or more categories of users to which the user belongs. For example, the information may identify that the user belongs to a category of users associated with an age group of 20-29 years. The provider device may obtain the information associated with the user based on receiving a request to display the information associated with the user for the provider.

The request to display the information associated with the user may be associated with the communication session for the user and the provider. For example, the provider device may obtain the information based on receiving the request for the communication session (e.g., based on a phone number or address associated with the user device and/or based on information provided by the user prior to establishing the communication session). In other words, the request for the communication session, or the establishment of the communication session, may trigger the request to the provider device to display the information associated with the user.

In some implementations, the provider device may receive the request to display the information associated with the user from the provider (e.g., based on input to the provider device from the provider). For example, upon establishment of the communication session, the provider may access the information associated with the user via the provider device. In some implementations, the provider device may receive the request to display the information associated with the user without there being a communication session between the user and the provider. For example, the provider may access the information associated with the user via the provider device in connection with reviewing an application submitted by the user.

As shown in FIG. 1B, and by reference number 115, the provider device may determine an interaction profile for the provider. For example, the provider device may determine the interaction profile for the provider based on receiving the request for the communication session and/or based on receiving the request to display the information associated with the user. The interaction profile may indicate a bias of the provider in connection with one or more categories of users. For example, the interaction profile may provide a binary indication of bias (e.g., "biased" or "not biased") of the provider in connection with one or more categories of users. As another example, the interaction profile may provide an indication of a degree of bias (e.g., a percentage, a score, or the like, representative of bias) of the provider in connection with one or more categories of users. The categories of users may include demographic categories (e.g., an age 20-29 category, an age 30-39 category, and so forth; a male category, a female category, and so forth; a Florida resident category, a Texas resident category, and so forth), financial categories (e.g., a high income category, a low income category, and so forth), physical trait categories (e.g., a brown eye color category, a blue eye color category, and so forth), occupation categories (e.g., a business owner category, an electrician category, and so forth), among other examples.

The interaction profile for the provider may be based on interaction data associated with the provider. Thus, the interaction profile may be unique to the provider. The interaction data may relate to interpersonal interactions involving the provider during one or more previous communication sessions (e.g., with the user or with one or more other users). For example, the interaction data may include transcripts of the previous communication sessions, reviews of the previous communication sessions provided by the users involved in the previous communication sessions (e.g., in connection with a user satisfaction survey, or the like), and/or reviews of the provider provided by a supervisor or a manager (e.g., in connection with the provider's performance during communication sessions), among other examples.

The interaction data, additionally or alternatively, may relate to dispositions, by the provider, of one or more previous applications (e.g., submitted by the user or one or more other users). For example, the interaction data may include information from the previous applications (e.g., a requested loan amount), types of dispositions made by the provider for the previous applications (e.g., whether an application was approved, rejected, flagged for further review, or the like, by the provider), reviews associated with the previous applications provided by the users that submitted the previous applications (e.g., in connection with a user satisfaction survey, or the like), and/or reviews of the provider provided by a supervisor or a manager (e.g., in connection with the provider's performance in handling applications), among other examples.

The provider device may determine the interaction profile for the provider using a model (e.g., a machine learning model). The model may be trained, or otherwise configured, to output an interaction profile for a provider based on an input of interaction data for the provider. For example, the model may be trained to output an interaction profile based on information relating to interpersonal interactions involving the provider during one or more previous communication sessions with users. As another example, the model may be trained to output an interaction profile based on information relating to interactions of the provider with one or more previous applications of users. In some implementations, the model may be trained using historical data (e.g., transcripts) relating to previous interpersonal interactions of the provider during communication sessions and/or previous interactions of the provider with applications of users. In some implementations, the model may be specific to the provider (e.g., the model is used to determine the interaction profile of the provider and is not used to determine an interaction profile for a different provider). In some implementations, the interaction profile for the provider may be determined, using the model, and stored prior to the request for the communication session and/or the request for the information associated with the user. Here, the provider device may obtain the interaction profile from storage after receiving the request for the communication session and/or the request for the information associated with the user.

In some implementations, the model may use a feature set to determine an interaction profile for a provider, as described in connection with FIG. 2. The feature set may be based on external data, such as one or more informational articles (e.g., journal articles, news articles, blog articles, or the like, relating to bias and/or indicators of bias) and/or one or more social media posts (e.g., social media posts relating to bias and/or indicators of bias), among other examples. For example, another model may perform clustering of the external data, as described in connection with FIG. 2, and the resulting clusters may be used to identify the feature set for the model. In some implementations, the model may be trained to output an interaction profile for a provider based on an input of the external data and the interaction data for the provider. In this way, the feature set and/or the output of the model may be adaptive to current viewpoints on bias.

As shown in FIG. 1C, and by reference number 120, the provider device may generate a visual representation depicting at least a face of a person. In some implementations, the visual representation may depict something other than a face of a person, such as an object, an animal, or the like. The visual representation may be an image, a video, a three-dimensional model, or the like. In some implementations, the visual representation that is generated may be for presentation on the provider device during the communication session with the user. Additionally, or alternatively, the visual representation that is generated may be for presentation on the provider device with information associated with the user (e.g., account information associated with the user and/or an application submitted by the user).

The provider device may generate the visual representation based on the interaction profile of the provider. For example, the provider device may generate the visual representation such that one or more characteristics associated with the one or more categories of users, identified by the interaction profile as being associated with bias, are absent from the face of the person. As an example, if the interaction profile of the provider indicates that the provider exhibits bias toward users aged 20-29, then the visual representation may depict a face of a person that is older (e.g., the characteristics that are absent from the face are characteristics associated with a youthful face). As another example, if the interaction profile of the provider indicates that the provider exhibits bias toward users with blue eye color, then the visual representation may depict a face of a person with brown eye color (e.g., the characteristic that is absent from the face is blue eye color).

The visual representation depicting the face of the person may not be of an actual person. For example, the visual representation may be a photoreal image of the face of the person. In some implementations, the provider device may generate the visual representation using an artificial intelligence technique, such as a neural network. For example, the provider device may generate the visual representation using a generative adversarial network. As an example, a generator model may be trained to generate an image of a face of a person that possesses or lacks particular characteristics in a manner that "fools" a discriminator model.

Thus, the generator model may output the visual representation based on an input of the interaction profile of the provider (e.g., indicating the one or more categories of users toward which the provider exhibits bias). For example, the generator model may output the visual representation based on whether the provider exhibits bias toward one or more categories of users. Additionally, or alternatively, the generator model may output the visual representation based on a degree of bias exhibited by the provider toward one or more categories of users. For example, if the interaction profile is indicative of slight bias toward users aged 20-29, then the visual representation may depict a face of a person 35 years of age; whereas, if the interaction profile is indicative of high bias toward users aged 20-29, then the visual representation may depict a face of a person 60 years of age. Furthermore, the generator model may output the visual representation based on an input of user information for the user (e.g., demographic information, financial information, or the like, associated with the user). For example, if the user information indicates that the user has blue eye color, and the interaction profile of the provider is indicative of bias toward blue eye color, then the visual representation may depict a face of a person with brown eye color; whereas, if the user information indicates that the user is 35 years old, and the interaction profile of the provider is not indicative of bias toward any age group, then the visual representation may depict a face of a person that is the user's age. Thus, the visual representation that is generated may be unique to the combination of the provider (e.g., the interaction profile for the provider) and the user (e.g., the user information for the user).

As shown by reference number 125, the provider device may cause presentation of the visual representation (e.g., the image, the video, or the like) to the provider on the provider device or on another device associated with the provider. For example, the provider device may cause presentation of the visual representation during the communication session. The provider device may cause presentation of the visual representation with (e.g., alongside) the information associated with the user (e.g., account information). For example, the provider device may cause presentation of the visual representation with (e.g., alongside) an application submitted by the user (e.g., without there being a communication session between the user and the provider). The provider device may cause presentation of the visual representation by displaying the visual representation or by providing the visual representation to the other device, thereby causing the other device to display the visual representation.

In some implementations, the provider device may monitor (e.g., using a camera, a microphone, or the like), or otherwise obtain information relating to, interactions of the provider with the user during the communication session. For example, the provider device may obtain information relating to facial expressions, gestures, a speech cadence, a tone of voice, and/or a wording, among other examples, used by the provider during the communication session. Based on this information, the provider device may determine whether the provider is exhibiting bias, and/or a degree of bias exhibited, toward the user during the communication session, in a similar manner as described above. If bias is determined, and/or if a threshold degree of bias is determined, then the provider device may perform one or more actions. For example, the provider device may terminate the communication session, transfer the communication session to another provider, and/or provide a notification alerting the provider of the bias (e.g., indicating one or more categories of users toward which the provider is exhibiting bias, indicating speech, tone, or wording indicative of the bias, or the like).

Similarly, the provider device may monitor, or otherwise obtain information relating to, interactions of the provider with an application of the user during the provider's review of the application. Moreover, the provider device may obtain information relating to the provider's disposition of the application. Based on this information, the provider device may determine whether the provider is exhibiting bias, and/or a degree of bias exhibited, toward the user in connection with the application, in a similar manner as described above. If bias is determined, and/or if a threshold degree of bias is determined, then the provider device may perform one or more actions. For example, the provider device may void the provider's disposition of the application, transfer the application to another provider, and/or adjust scoring used by the provider during the review of the application.

In this way, the provider device may determine or predict the bias that the provider is to exhibit toward a user and combat the determined bias of the provider through generation of the visual representation. For example, the provider may respond favorably to the visual representation, thereby resulting in unbiased interaction during the communication session or with the application submitted by the user. As described above, the provider device may employ a rigorous and automated process that increases accuracy and consistency and reduces delay associated with bias determination and correction. Moreover, the operations performed by the provider device may reduce call times, reduce call transfers, reduce repetitive application submissions, or the like, thereby conserving associated processing resources and/or network resources.

As indicated above, FIGS. 1A-1C are provided as an example. Other examples may differ from what is described with regard to FIGS. 1A-1C.

Figure 2:
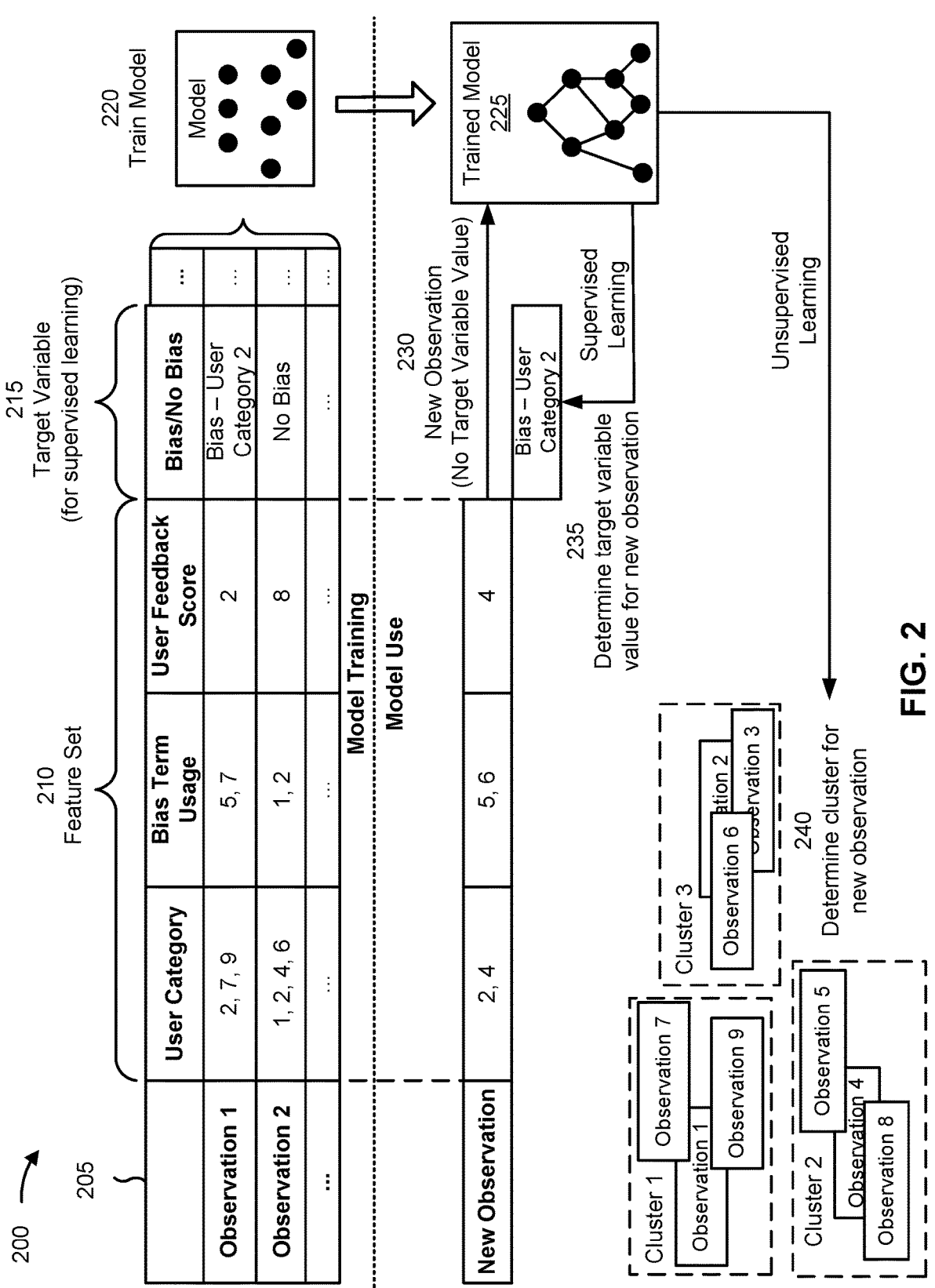
FIG. 2 is a diagram illustrating an example of training and using a machine learning model in connection with bias identification.

FIG. 2 is a diagram illustrating an example 200 of training and using a machine learning model in connection with bias identification. The machine learning model training and usage described herein may be performed using a machine learning system. The machine learning system may include or may be included in a computing device, a server, a cloud computing environment, or the like, such as the provider device 320 and/or the server device 330 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the provider device 320 and/or the server device 330, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the provider device 320 and/or the server device 330. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of user category, a second feature of bias term usage, a third feature of user feedback score, and so on. As shown, for a first observation, the first feature may have a value of 2, 7, and 9 (e.g., numeric identifiers mapped to particular user categories), the second feature may have a value of 5 and 7 (e.g., numeric identifiers mapped to particular terminology associated with bias), the third feature may have a value of 2, and so on. These features and feature values are provided as examples, and may differ in other examples. For example, the feature set may include one or more of the following features: user category, bias term usage during a communication session, other flagged term usage during a communication session, whether a communication session resolved or did not resolve a user's issue, a disposition type of a user's application, or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is whether bias is exhibited (bias/no bias) toward a category of user, which has a value of bias for user category 2 for the first observation. This value may be included in an interaction profile, as described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of user category, a second feature of bias term usage, a third feature of user feedback score, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of bias for user category 2 for the target variable of bias/no bias for the new observation, as shown by reference number 235. Based on this prediction, the machine learning system may provide a recommendation, may provide output for determination of a recommendation, may perform an automated action, and/or may cause an automated action to be performed (e.g., by instructing another device to perform the automated action), among other examples. The automated action may include, for example, invoking a generator model to generate a visual representation, as described above.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a cluster (e.g., bias), then the machine learning system may provide a recommendation, or may perform an automated action and/or may cause an automated action to be performed (e.g., by instructing another device to perform the automated action) based on classifying the new observation in the cluster, such as the automated action described above.

As described above, clustering may also be used to cluster external data, such as informational articles or social media posts, as described above. This may be used, for example, to identify bias terms, bias sentiment, or the like, which can be used to derive a feature set for a supervised model, as described above.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to identify bias. The machine learning system enables recognition and/or identification of tens, hundreds, thousands, or millions of features and/or feature values for tens, hundreds, thousands, or millions of observations, thereby increasing accuracy and consistency and reducing delay associated with bias identification relative to requiring computing resources to be allocated for tens, hundreds, or thousands of operators to manually identify bias using the features or feature values.

As indicated above, FIG. 2 is provided as an example. Other examples may differ from what is described in connection with FIG. 2.

Figure 3:
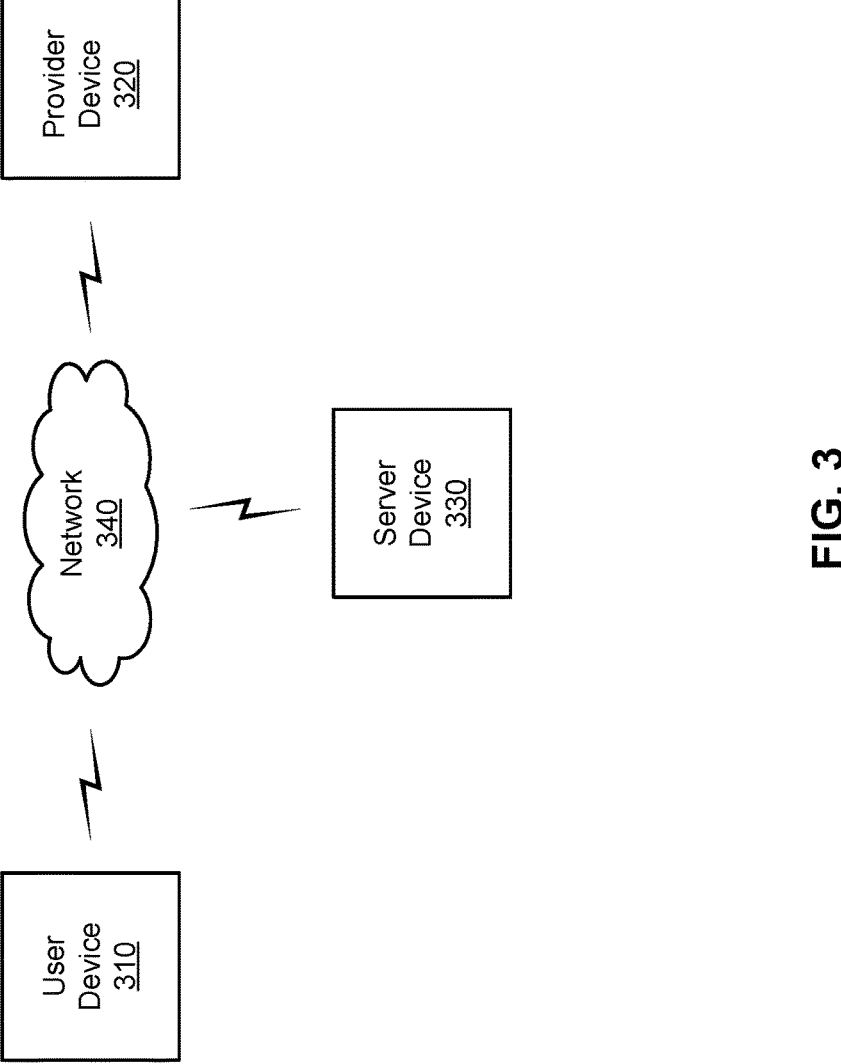
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user device 310, a provider device 320, a server device 330, and a network 340. Devices of environment 300 may interconnect via wired connections, wireless connections, or a combination of wired and wireless connections.

The user device 310 includes one or more devices capable of receiving, generating, storing, processing, and/or providing information associated with a communication session and/or submission of an application, as described elsewhere herein. The user device 310 may include a communication device and/or a computing device. For example, the user device 310 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The provider device 320 includes one or more devices capable of receiving, generating, storing, processing, and/or providing information associated with a communication session, a submitted application, bias identification, and/or image generation, as described elsewhere herein. The provider device 320 may include a communication device and/or a computing device. For example, the provider device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The server device 330 includes one or more devices capable of receiving, generating, storing, processing, providing, and/or routing information associated with external data, such as informational articles or social media posts, and/or internal data, such as provider interaction data, as described elsewhere herein. The server device 330 may include a communication device and/or a computing device. For example, the server device 330 may include a server, such as an application server, a client server, a web server, a database server, a host server, a proxy server, a virtual server (e.g., executing on computing hardware), or a server in a cloud computing system. In some implementations, the server device 330 includes computing hardware used in a cloud computing environment.

The network 340 includes one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The quantity and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
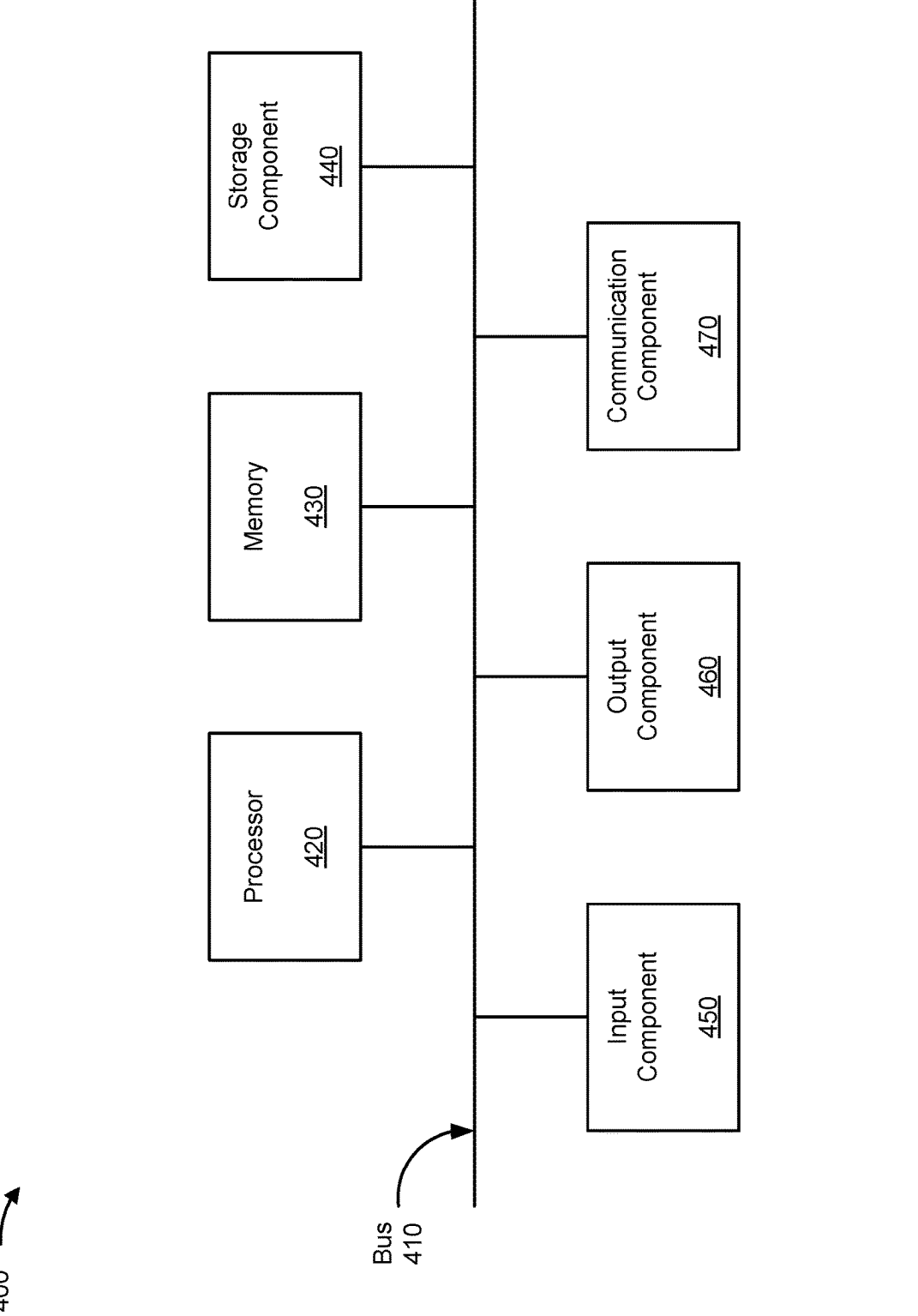
FIG. 4 is a diagram of example components of one or more devices of FIG. 2.

FIG. 4 is a diagram of example components of a device 400, which may correspond to user device 310, provider device 320, and/or server device 330. In some implementations, user device 310, provider device 320, and/or server device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with visual representation generation for bias correction. In some implementations, one or more process blocks of FIG. 5 may be performed by a device (e.g., provider device 320). In some implementations, one or more process blocks of FIG. 5 may be performed by another device or a group of devices separate from or including the device, such as user device 310 and/or server device 330. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include determining an interaction profile for a provider that is to engage with a user in a communication session, wherein the interaction profile is based on interaction data relating to interpersonal interactions involving the provider during one or more previous communication sessions, and wherein the interaction profile indicates a bias of the provider in connection with one or more categories of users (block 510). As further shown in FIG. 5, process 500 may include generating, based on the interaction profile, a visual representation that depicts at least a face of a person for presentation to the provider during the communication session, wherein one or more characteristics associated with the one or more categories of users are absent from the face of the person (block 520). As further shown in FIG. 5, process 500 may include causing presentation of the visual representation to the provider during the communication session (block 530).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for image generation, the system comprising:
one or more memories; and
one or more processors, communicatively coupled to the one or more memories, configured to:
determine, using a machine learning model and based on interaction data, an interaction profile for a provider,
wherein the interaction data includes demographic information of users involved in interactions with the provider, and
wherein the interaction profile provides an indication of bias of the provider toward one or more categories of users;
generate an image that depicts at least a face of a person,
wherein one or more characteristics associated with the one or more categories of users are absent from the face of the person; and
cause presentation of the image on a device associated with the provider during a communication session with a user.

2. The system of claim 1, wherein the interaction data further includes at least one of:
transcripts for one or more previous communication sessions involving the provider, or
reviews of the one or more previous communication sessions.

3. The system of claim 1, wherein the interaction profile is unique to the provider.

4. The system of claim 1, wherein the one or more processors, to determine the interaction profile, are configured to:
input, into the machine learning model, the interaction data to cause the machine learning model to output the interaction profile.

5. The system of claim 1, wherein the machine learning model is a first machine learning model; and
wherein the one or more processors, to generate the image, are configured to:
generate the image using a second machine learning model.

6. The system of claim 5, wherein the one or more processors, to generate the image, are configured to:
input, into the second machine learning model, the interaction profile to cause the second machine learning model to output the image.

7. The system of claim 1, wherein the communication session comprises at least one of a voice call or an electronic chat.

8. A non-transitory computer-readable medium storing a set of instructions, the set of instructions comprising:
one or more instructions that, when executed by one or more processors of a device, cause the device to:
determine, using a machine learning model and based on interaction data, an interaction profile for a provider,
wherein the interaction data includes demographic information of users involved in interactions with the provider, and wherein the interaction profile provides a binary indication of bias of the provider toward one or more categories of users;

generate an image that depicts at least a face of a person, wherein one or more characteristics associated with the one or more categories of users are absent from the face of the person; and cause presentation of the image on the device during a communication session with a user.

9. The non-transitory computer-readable medium of claim 8, wherein the one or more categories of users include:

an age category, a male category, a female category, a physical trait category, an occupation category, or a financial category.

10. The non-transitory computer-readable medium of claim 8, wherein the interaction data further includes transcripts for one or more previous communication sessions involving the provider.

11. The non-transitory computer-readable medium of claim 8, wherein the interaction profile is unique to the provider.

12. The non-transitory computer-readable medium of claim 8, wherein the machine learning model is a first machine learning model; and wherein the one or more instructions, that cause the device to generate the image, cause the device to:

generate the image using a second machine learning model.

13. The non-transitory computer-readable medium of claim 12, wherein the one or more instructions, that cause the device to generate the image, cause the device to:

input, into the second machine learning model, the interaction profile to cause the second machine learning model to output the image.

14. A method, comprising:

determining, by a device using a machine learning model and based on interaction data, an interaction profile for a provider, wherein the interaction data includes demographic information of users involved in interactions with the provider, and wherein the interaction profile provides an indication of bias of the provider toward one or more categories of users;

generating, by the device, a visual representation that depicts at least a face of a person, wherein one or more characteristics associated with the one or more categories of users are absent from the face of the person; and causing, by the device, presentation of the visual representation on the device during a communication session with a user.

15. The method of claim 14, wherein the interaction profile is unique to the provider.

16. The method of claim 14, wherein the indication of bias is an indication of a degree of bias.

17. The method of claim 14, wherein determining the interaction profile comprises:

inputting, into the machine learning model, the interaction data to cause the machine learning model to output the interaction profile.

18. The method of claim 17, wherein the machine learning model is a first machine learning model; and wherein generating the visual representation comprises:

inputting, into a second machine learning model, the interaction profile to cause the second machine learning model to output the visual representation.

19. The method of claim 14, wherein the visual representation is one of:

an image, a video, or a three-dimensional model.

20. The method of claim 14, wherein the communication session comprises at least one of a voice call or an electronic chat.

* * * * *